(12) United States Patent  (10) Patent No.: US 12,390,980 B2
Perkins  (45) Date of Patent: Aug. 19, 2025

(54) ADJUSTABLE MOLDING SYSTEM FOR FORMING MATERIAL ON PIPE

(71) Applicant: Bayou Holdco, Inc., Houston, TX (US)

(72) Inventor: Randall Perkins, Houston, TX (US)

(73) Assignee: Bayou HoldCo, Inc., Houston, TX (US)

( * ) Notice: Subject to any disclaimer, the term of this patent is extended or adjusted under 35 U.S.C. 154(b) by 607 days.

(21) Appl. No.: 17/564,345

(22) Filed: Dec. 29, 2021

(65) Prior Publication Data
US 2022/0203603 A1 Jun. 30, 2022

Related U.S. Application Data

(60) Provisional application No. 63/132,698, filed on Dec. 31, 2020.

(51) Int. Cl.
B29C 63/00 (2006.01)
B29C 33/26 (2006.01)
B29C 33/30 (2006.01)
B29L 23/00 (2006.01)

(52) U.S. Cl.
CPC .......... *B29C 63/0073* (2013.01); *B29C 33/26* (2013.01); *B29C 33/308* (2013.01); *B29L 2023/225* (2013.01)

(58) Field of Classification Search
CPC ... B29C 63/0073; B29C 33/26; B29C 33/308; B29L 2023/225
See application file for complete search history.

(56) References Cited

U.S. PATENT DOCUMENTS 6,644,905 B1 * 11/2003 Peterson ................ A01D 46/26
198/317
10,316,993 B2  6/2019 Mueller et al.
(Continued)

FOREIGN PATENT DOCUMENTS

CN  203858162 U  10/2014
CN  205192869 U   4/2016
(Continued)

OTHER PUBLICATIONS

Meiwes, Karl et al., Full-Scale Reeling Tests of HFI Welded Pipe for Offshore Reel-Laying Installation, Proceedings of the 2014 10th International Pipeline Conference, Sep. 29-Oct. 3, 2014, 7 pages, Calgary, Alberta, Canada.
(Continued)

*Primary Examiner* — Nahida Sultana
(74) *Attorney, Agent, or Firm* — Stinson LLP

(57) ABSTRACT

A molding system for applying insulation to a pipe employs an elongate mold in which to receive the pipe. A mold adjustment mechanism can adjust a shape of the mold to correspond to a shape of the pipe as the pipe sags in the mold cavity. In a method of insulating the pipe, the shape of the mold is adjusted to correspond to the shape of the sagging pipe and curable material is imparted into the mold while maintaining the adjusted shape of the mold. The elongate mold can include at least one double-walled mold member with an inner form wall, an outer jacket, and a plurality of radial supports that support the outer jacket on the inner form wall in radially spaced apart relation therewith.

29 Claims, 11 Drawing Sheets

(56) References Cited

U.S. PATENT DOCUMENTS

| | | | | |
|---|---|---|---|---|
| 2013/0129570 A1* | 5/2013 | Jung | ................... | B01J 8/1809 |
| | | | | 422/119 |
| 2017/0355112 A1* | 12/2017 | Perkins | ............ | B29C 45/14073 |
| 2017/0355114 A1* | 12/2017 | Perkins | .................. | B29C 45/80 |

FOREIGN PATENT DOCUMENTS

| | | |
|---|---|---|
| CN | 104502089 B | 2/2017 |
| CN | 106113474 A | 1/2018 |
| CN | 207197911 U | 4/2018 |
| CN | 106500900 B | 11/2018 |
| CN | 109848329 A | 6/2019 |
| CN | 208936940 U | 6/2019 |
| CN | 106840913 B | 8/2019 |
| CN | 107610926 B | 10/2019 |
| CN | 110961497 A | 4/2020 |

OTHER PUBLICATIONS

Flexure Test of Insulation Materials—Four Point Blend, Testresources. com, Jun. 30, 2020, 7 pages.

\* cited by examiner

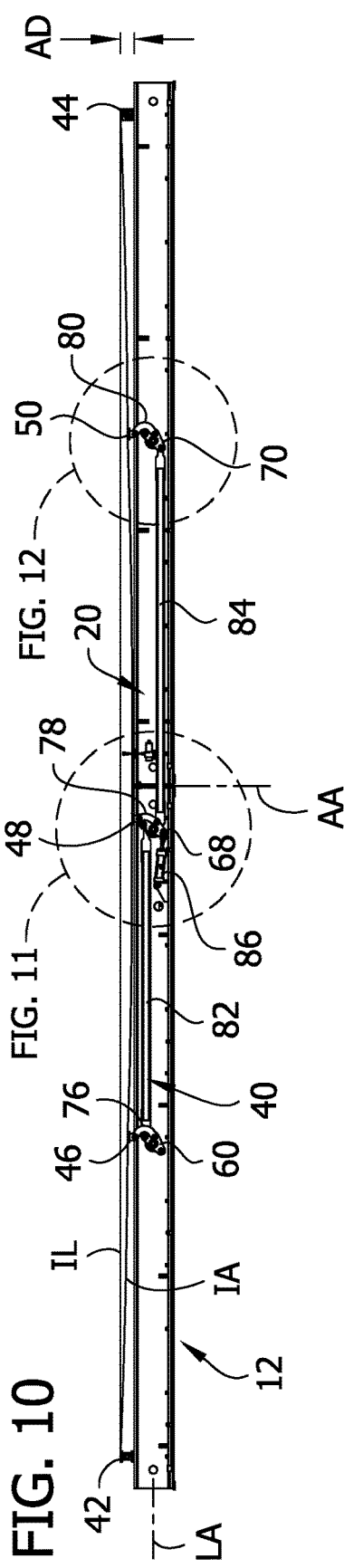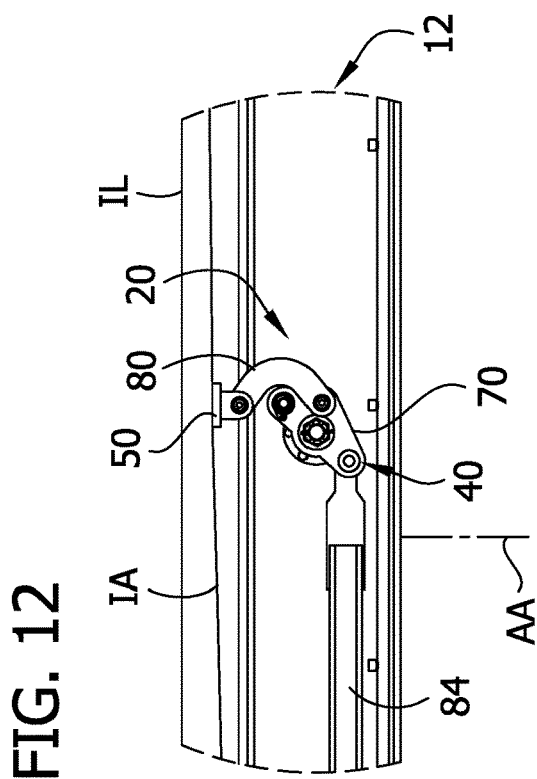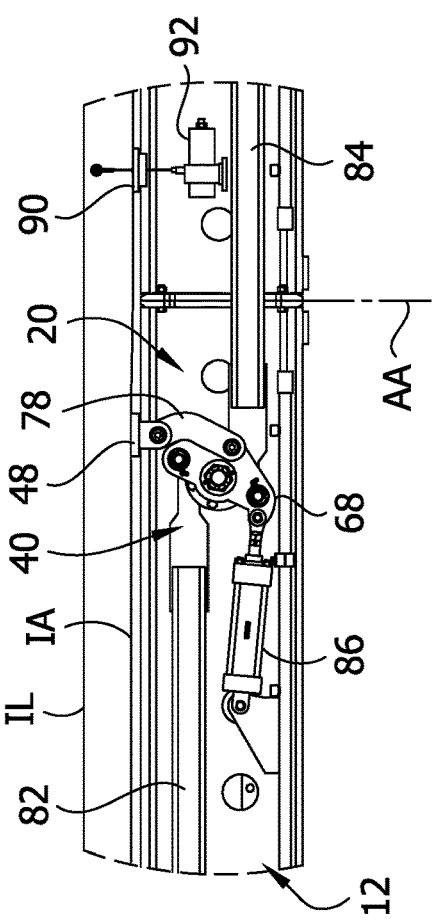
FIG. 10
FIG. 12
FIG. 11

107

ADJUSTABLE MOLDING SYSTEM FOR FORMING MATERIAL ON PIPE

CROSS-REFERENCE TO RELATED APPLICATION

This application claims priority to U.S. Provisional Patent Application No. 63/132,698, filed Dec. 31, 2021, which is hereby incorporated by reference in its entirety for all purposes.

FIELD

This invention generally pertains to a molding system for applying insulation to the exterior of long lengths of pipe. Such insulated pipes are used, for example, in oil and gas exploration and extraction.

BACKGROUND

As explained in U.S. Patent Application Publication No. 2017/0355112, which is hereby incorporated by reference in its entirety, it is desirable to form individual insulated pipes for the oil and gas industry in very long lengths, for example, such that each individual insulated pipe has a length in excess of 35 feet, e.g., a length of 40 feet or more.

As shown in FIG. 1, a known challenge in the field of molding systems for applying pipe insulation to long lengths of pipe is that the middle portion of a pipe P will sag within a mold M. If only the ends of the pipe P are held in place, the middle portion will sag under its own weight. The most common pipe sizes for the deep water oil production industry (a possible end user of long insulated pipes) are 6.625, 8.625, 10.750, and 12.750 inch OD. Pipe wall thickness typically ranges from 0.750 inches to 2 inches. The vertical sag of the middle portion of these types of steel pipes ranges from 0.4 to 3 inches for a 40-foot pipe simply supported at its ends. Greater pipe wall thicknesses, due to an increase in linear weight, increases sag for a given pipe diameter. Thus, pipes of the same length can sag by different amounts. Sagging of the pipe causes a loss of concentricity of the pipe and the mold. If not compensated for, sagging would cause significant variance in insulation thickness along the pipe, and in some instances, of portions of the pipe could be bare of insulation.

As shown in FIG. 2, the conventional remedy for sagging of the pipe is to place supports S along the length of the mold M to prop the middle portion of the pipe P up within the mold and prevent it from sagging. But regardless of how these supports S are deployed, the use of the supports will inherently introduce discontinuity into the insulation material, requiring insulation to be added later to fill the voids left by the intermediate supports S. However, the later applied insulation is still a discontinuity and creates an eventual source for material failure. That is, the insulation material that fills the space where the pipe P was supported by a peg S or the like during molding will be stressed differently than the remainder of the insulation material, and the boundaries between the differently stressed materials will form weak points where the insulation will eventually fail.

SUMMARY

In one aspect, a molding system for applying insulation to a pipe comprises an elongate mold having a length along a longitudinal axis extending from a first end portion to a second end portion. The elongate mold defines a mold cavity in which to receive the pipe such that the pipe is supported at the first end portion and the second end portion of the elongate mold and is allowed to sag in the mold cavity between the first end portion and the second end portion of the elongate mold. A mold adjustment mechanism is configured to adjust a shape of the mold to correspond to a shape of the pipe as the pipe sags in the mold cavity.

In another aspect, a method of insulating the pipe comprises positioning the pipe in a mold cavity of an elongate mold such that the pipe is supported at a first end portion and a second end portion of the elongate mold and sags in the mold cavity between the first end portion and the second end portion of the elongate mold. A shape of the elongate mold is adjusted to correspond to a shape of the pipe as the pipe sags in the mold cavity. Curable material is imparted into the elongate mold while maintaining the shape of the elongate mold to correspond to the shape of the pipe as the pipe sags in the mold cavity.

In another aspect, a molding system for applying insulation to a pipe comprises an elongate mold having a length along a longitudinal axis extending from a first end portion to a second end portion. The elongate mold defines a mold cavity in which to receive the pipe such that the pipe is supported at the first end portion and the second end portion of the elongate mold. The elongate mold comprises at least one double-walled elongate mold member extending along the length of the elongate mold and defining at least a portion of the mold cavity. The double-walled elongate mold member comprises an inner form wall and an outer jacket wall spaced apart radially outward of the inner form wall with respect to the longitudinal axis such that the inner form wall and the outer jacket wall define a fluid annulus section therebetween. The outer jacket wall is supported on the inner form wall in radially spaced apart relation therewith without internal bulkheads in the fluid annulus section.

In another aspect, a molding system for applying insulation to a pipe comprises an elongate mold having a length along a longitudinal axis extending from a first end portion to a second end portion. The elongate mold defines a mold cavity in which to receive the pipe such that the pipe is supported at the first end portion and the second end portion of the elongate mold. The elongate mold comprises at least one double-walled elongate mold member extending along the length of the elongate mold and defining at least a portion of the mold cavity. The double-walled elongate mold member comprises an inner form wall having a perimeter edge margin. An outer jacket wall has a perimeter edge margin. The outer jacket wall is spaced apart radially outward of the inner form wall with respect to the longitudinal axis such that the inner form wall and the outer jacket wall define a fluid annulus section therebetween. A seal is sealingly engaged with the perimeter edge margin of the inner form wall and the perimeter edge margin of the outer jacket wall to seal the fluid annulus section. A plurality of radial supports at spaced apart locations along the length of the mold each have an inner end region and an outer end region spaced apart along a respective support axis. Each support axis extends generally radially with respect to the longitudinal axis. The inner end region of each radial support is joined to the inner form wall, and the outer end region of the radial support is joined to the outer jacket wall whereby the radial supports support the inner form wall and the outer jacket wall in radially spaced apart relation. Each of the plurality of radial supports is spaced apart from the seal such that the fluid annulus section extends 360° about each radial support with respect to the respective support axis.

In another aspect, a molding system for applying insulation to a pipe comprises an elongate mold having a length along a longitudinal axis extending from a first end portion to a second end portion. The elongate mold defines a mold cavity in which to receive the pipe such that the pipe is supported at the first end portion and the second end portion of the elongate mold. The elongate mold comprises at least one double-walled elongate mold member extending along the length of the elongate mold and defining at least a portion of the mold cavity. The double-walled elongate mold member comprises an inner form wall and an outer jacket wall spaced apart radially outward of the inner form wall with respect to the longitudinal axis such that the inner form wall and the outer jacket wall define a fluid annulus section therebetween. The double-walled elongate mold further comprises a plurality of radial supports at spaced apart locations along the length of the mold. Each radial support has an inner end region and an outer end region spaced apart along a support axis extending generally radially with respect to the longitudinal axis. Each radial support comprises an annular component with an interior portion extending circumferentially about the support axis and an exterior portion extending circumferentially about the support axis. Each radial support is joined to the inner form wall at the inner end region along the interior portion and being joined to the outer jacket wall at the outer end region along the exterior portion.

In another aspect, a molding system for applying insulation to a pipe comprises an elongate mold having a length along a longitudinal axis extending from a first end portion to a second end portion. The elongate mold defines a mold cavity in which to receive the pipe such that the pipe is supported at the first end portion and the second end portion of the elongate mold. The elongate mold comprises at least one double-walled elongate mold member extending along the length of the elongate mold and defining at least a portion of the mold cavity. The double-walled elongate mold member comprises an inner form wall and an outer jacket wall spaced apart radially outward of the inner form wall with respect to the longitudinal axis such that the inner form wall and the outer jacket wall define a fluid annulus section therebetween. The outer jacket wall is supported on the inner form wall such that the annulus section has a radial thickness with respect to the longitudinal axis of less than 1.0 inches.

In another aspect, a method of making an elongate mold member of an elongate mold configured to define a mold cavity in which to receive the pipe for applying insulation material to the perimeter of the pipe comprises forming an inner form wall. An outer jacket wall member is supported on the inner form wall member such that the outer jacket wall member is radially spaced apart from the inner form wall with respect to a longitudinal axis of the elongate mold and the inner form wall and the outer jacket wall define a fluid annulus section therebetween. Each of a plurality of radial supports is placed into spaced apart openings formed in the outer jacket wall. Each of the radial supports is joined to each of the inner form wall and the outer jacket wall.

Other aspects and features will be apparent hereinafter.

BRIEF DESCRIPTION OF THE DRAWINGS

FIG. 10 is an elevation of the base and the mold adjustment mechanism;

FIG. 11 is an enlarged view of the portion of FIG. 10 at the callout for FIG. 11;

FIG. 12 is an enlarged view of the portion of FIG. 10 at the callout for FIG. 12;

Corresponding reference characters indicate corresponding parts throughout the drawings.

DETAILED DESCRIPTION

Figure 1:
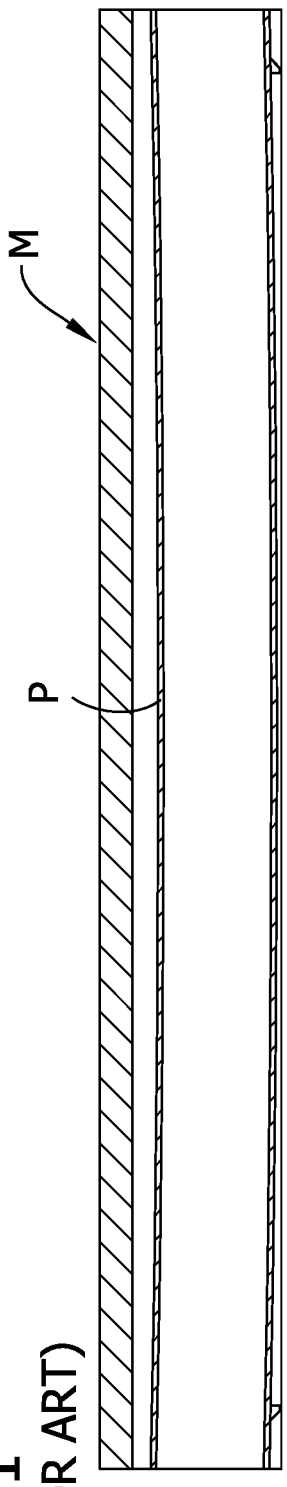
FIG. 1 is a longitudinal cross section of an elongate mold for applying insulation to a pipe of the prior art, in which the pipe is simply supported at its end portions inside the elongate mold and allowed to sag at its middle.
Figure 2:
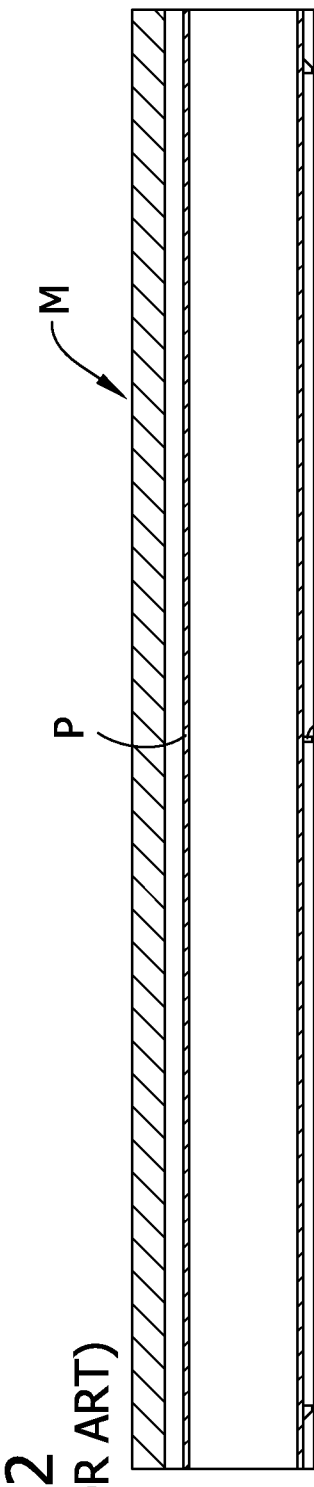
FIG. 2 is a longitudinal cross section of another elongate mold for applying insulation to a pipe of the prior art, in which the pipe is supported at its end portions inside the mold and is braced against sagging by a centralizing peg at a middle portion of the pipe.
Figure 3:
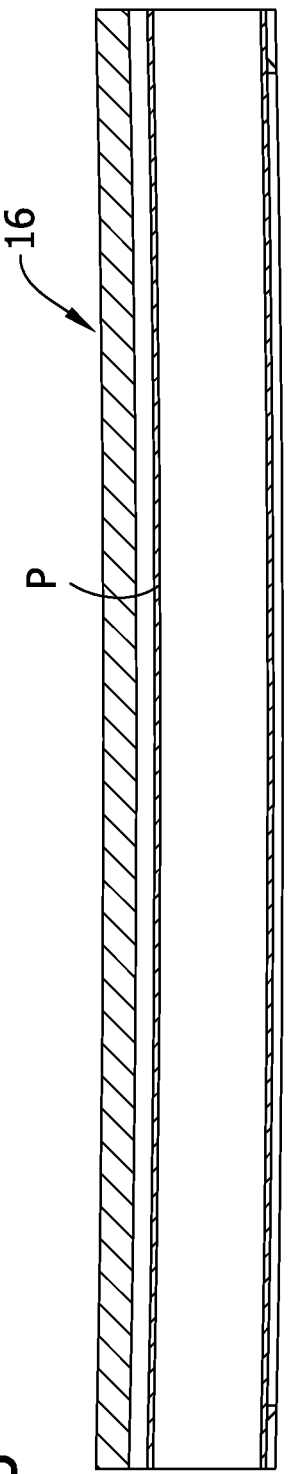
FIG. 3 is a longitudinal cross section of an elongate mold in accordance with the present disclosure, in which a pipe is simply supported at its end portions inside the elongate mold and the elongate mold is adjusted to correspond to a shape of the pipe as it sags within the mold.

The inventors have recognized that an advantageous way of addressing the natural tendency of a pipe to sag under its own weight is to adjust the shape of the mold to correspond to the shape of the pipe. FIG. 3 illustrates one example of an elongate mold 16 having a curved (broadly, contoured) shape that matches the curved shape of the sagging pipe P. Comparing FIGS. 1 and 3, the illustrated pipe P sags within the molds M, 16 by the same amount. But in the prior art mold M of FIG. 1, the middle longitudinal portion of the pipe is located much closer to the bottom of the mold than the top, causing the annular mold cavity about the middle portion of the pipe P to have different radial dimensions at different circumferential locations. By contrast, the contoured mold 16 of FIG. 3, because its shape corresponds to the curvature of the pipe P, substantially centers the mold within the pipe along the entire length of the pipe so that the thickness of the applied insulation will be generally uniform.

One conceivable approach to matching the mold shape to that of a sagging pipe would be to support an elongate mold in the same manner as the pipe—i.e., only at the longitudinal end portions of the mold—so that only the middle portion of the mold sags just as the middle portion of the pipe sags. Similarly, a mold could be rigidly constructed to have a fixed curvature that matches the known curvature of a particular type of pipe when it sags. However, the inventors have recognized that it is desirable for a molding system to accommodate many different types of pipes, and each different pipe will sag a different amount. Accordingly, the inventors have recognized a need for a molding system comprising an elongate mold having a shape that can be dynamically adjusted to correspond to the shape of a sagging pipe supported in the mold.

Figure 4:
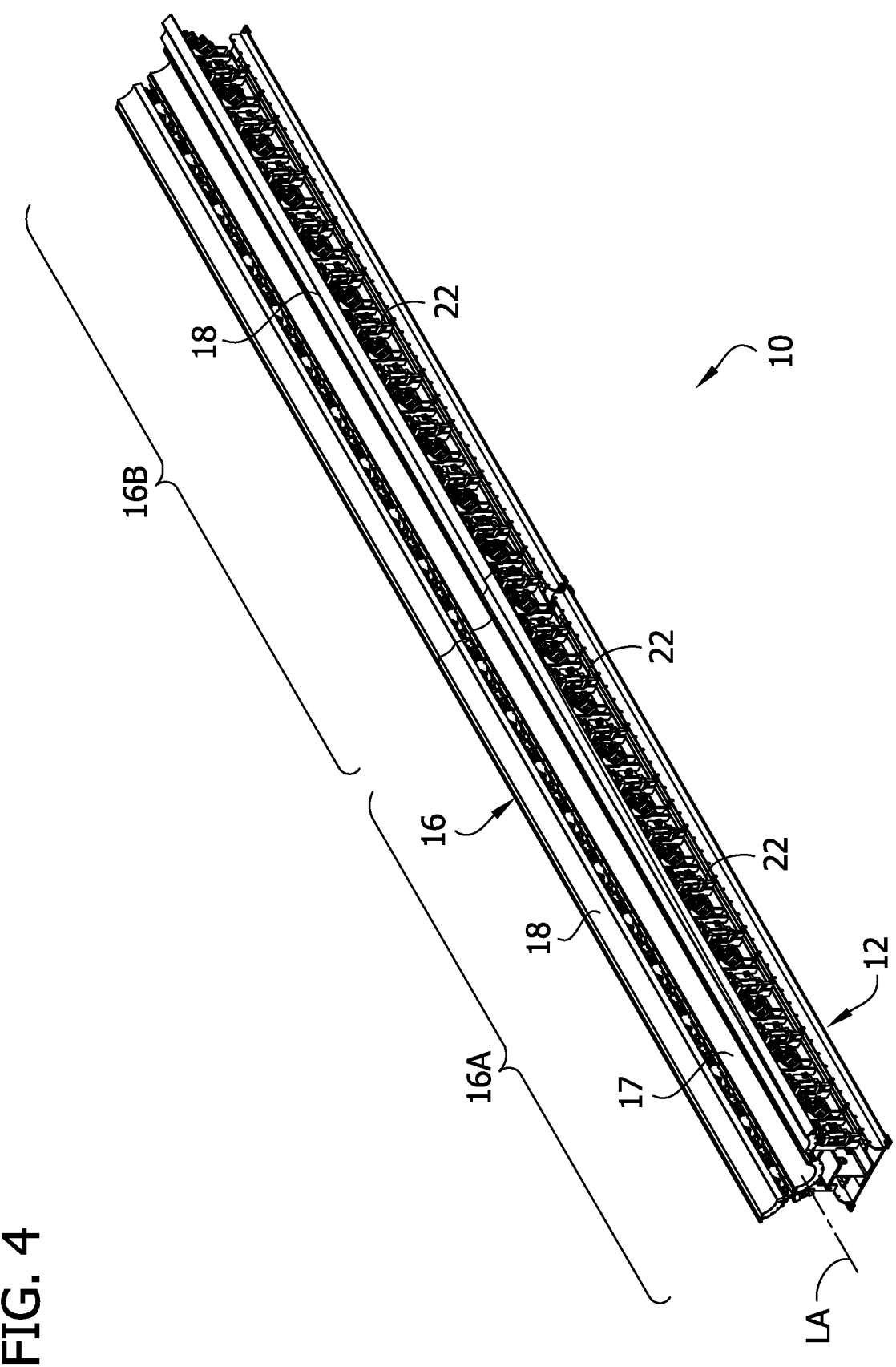
FIG. 4 is a perspective of a molding system that includes the elongate mold of FIG. 3 in an open position.
Figure 5:
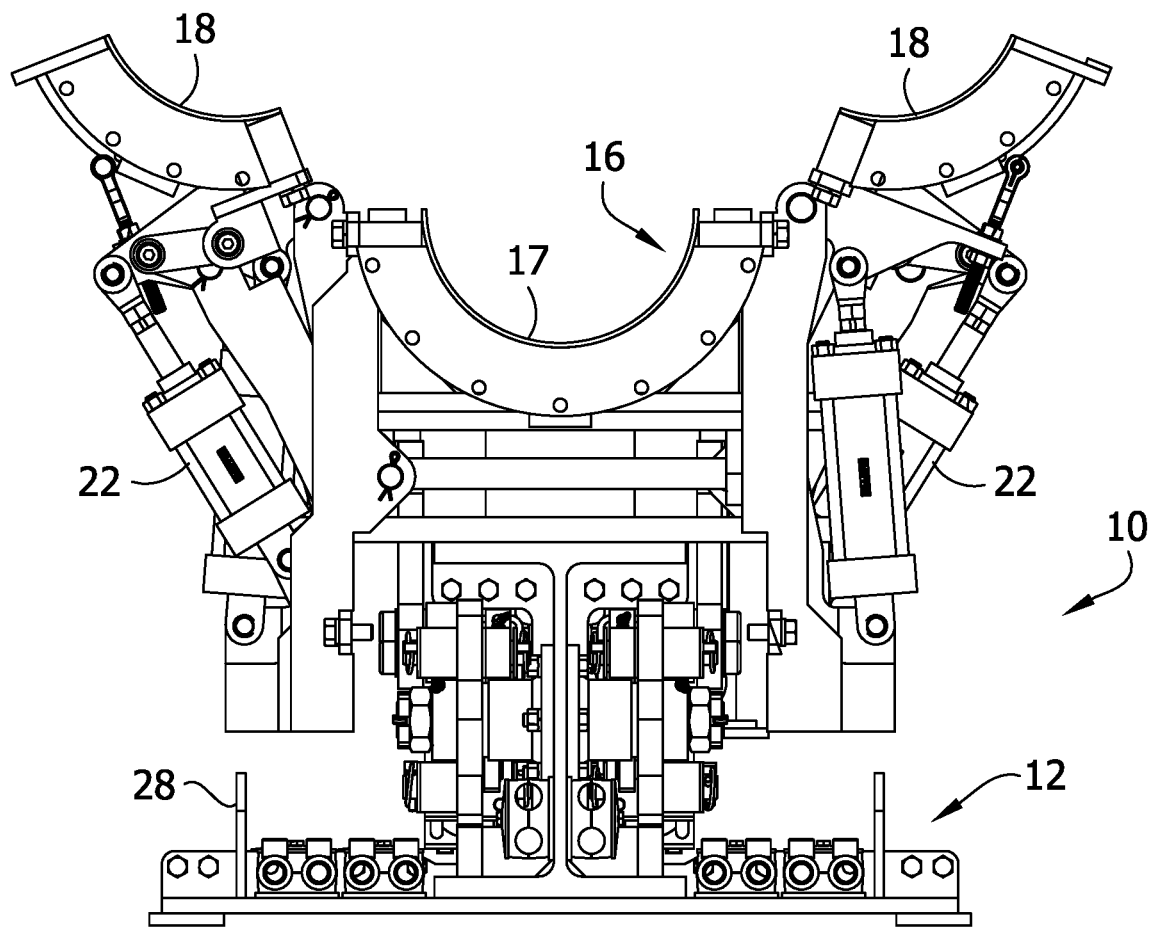
FIG. 5 is an end elevation of the molding system.

Referring now to FIGS. 4 and 5, an exemplary embodiment of a molding system encompassed within the scope of this disclosure is generally indicated at reference number 10. The molding system 10 generally comprises an elongate base 12 and an elongate mold 16, each having a first end portion and a second end portion spaced apart along a longitudinal axis LA. In general, the elongate mold has the same basic configuration has the pipe mold discussed in U.S. Patent Application Publication No. 2017/0355112, previously incorporated in this disclosure. Hence, the illustrated mold 16 comprises a longitudinal base mold member 17 and first and second longitudinal lid mold members 18 that are movably connected to the longitudinal base mold member for opening and closing the mold. As explained more fully below, the longitudinal base mold member 17 is mounted on the molding system base 12 so that a mold adjustment mechanism 20 (FIGS. 6 and 8-12) can adjust the shape of the elongate mold 16. A set of mold opening/closing actuators 22 (e.g., linear actuators such as hydraulic cylinders) are located along each lateral side of the base 12 and are connected between the base and a respective one of the longitudinal lid mold members 18 for moving the respective lid mold member between the opened and closed position. In the illustrated embodiment, the elongate mold 16 is formed from two elongate mold sections 16A, 16B that are joined together end-to-end to form the mold. In an exemplary embodiment each mold section 16A, 16B has a respective length that fits within a standard-sized shipping container (e.g., a length of about 22 feet), to allow for the mold to be portable or shippable. Suitably, the mold sections 16A, 16B come together to form an elongate mold 16 of at least about 35 feet in length (e.g., an elongate mold of 40 feet or greater in length). It is envisioned that more than two mold sections 16A, 16B could be assembled together end-to-end to form elongate molds of greater lengths. It is contemplated that the mold 16 will be used with a portable molding system as disclosed in U.S. patent application Ser. No. 17/505,191, filed Oct. 19, 2021, which is hereby incorporated by reference in its entirety. It is further contemplated that the mold 16 can be used to form multi-layer pipe insulations as taught by U.S. patent application Ser. No. 17/457,476, filed Dec. 3, 2021, which is hereby incorporated by reference in its entirety.

In an exemplary embodiment, the elongate mold 16 is a double-walled mold which provides a fluid annulus around the exterior of the mold cavity for receiving a heat transfer fluid (e.g., water) used, for example, to cool the contents of the mold. In a conventional double-walled mold of the three-part type disclosed in U.S. Patent Application Publication No. 2017/0355112, each of the base mold member and the lid mold members includes an inner form wall and an outer jacket wall spaced apart from the inner form wall by a radial distance of from about 1.0 inches to about 1.5 inches to define an annulus section between the inner form wall and the outer jacket wall. Flanges are disposed around the perimeter of the inner form wall and outer jacket wall to seal the perimeter of the annulus section. A plurality of bulkheads at spaced apart locations along the length of the mold member extend radially between the inner form wall and the outer jacket wall. The inventors have recognized that the conventional buildup of double-walled mold members (e.g., base and lid members) produces rigid parts that resist bending. Accordingly, the inventors have developed the double-walled elongate mold 16, shown in greater detail in FIGS. 14-15, to facilitate bending the mold using the mold adjustment mechanism 20 while still providing the heat transfer benefits of a double-walled mold.

Figure 14:
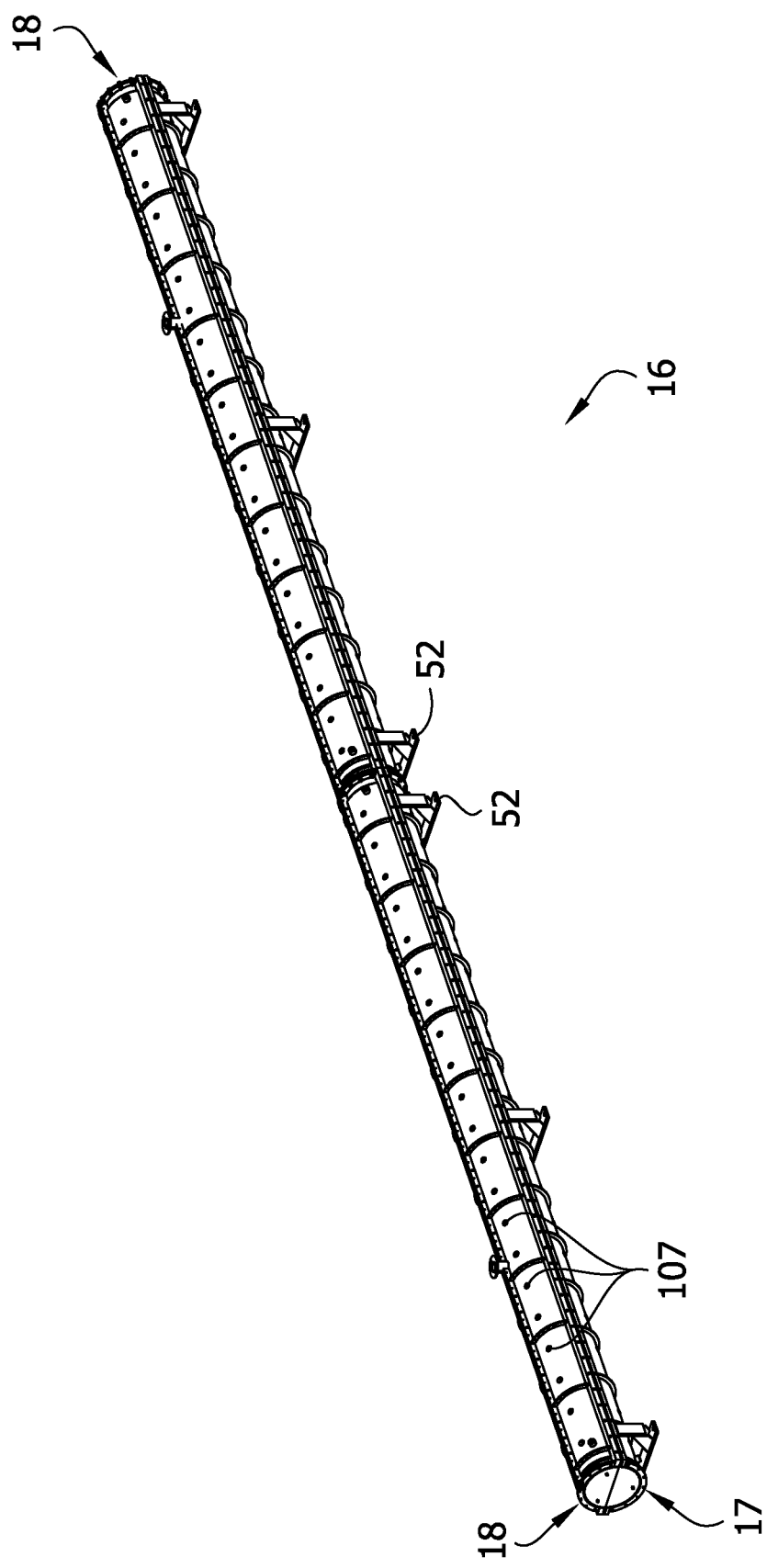
FIG. 14 is a perspective of an elongate mold of the molding system.
Figure 15:
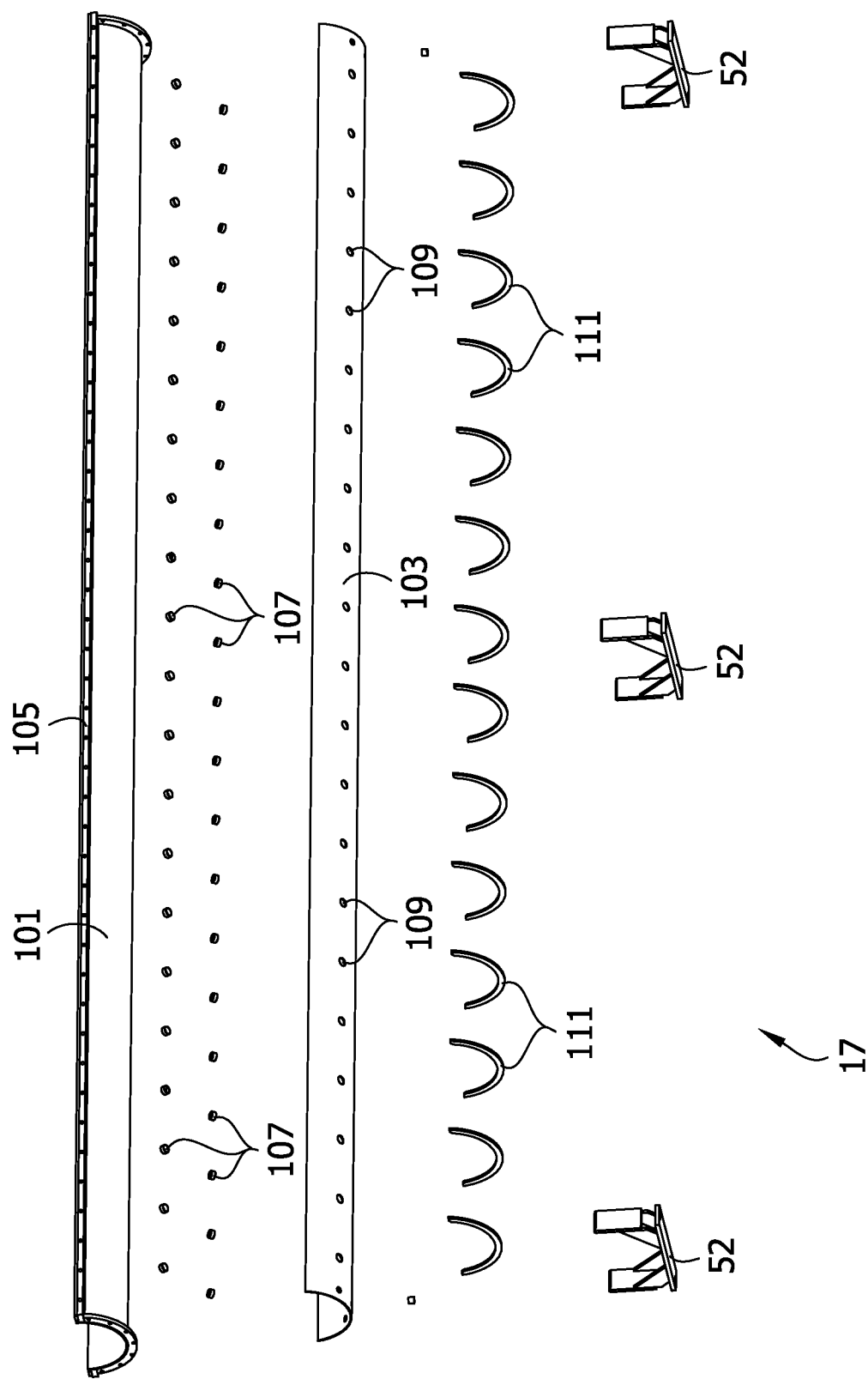
FIG. 15 is an exploded perspective of a double-walled base member of the elongate mold of FIG. 14.

FIG. 14 depicts an elongate mold 16 comprising a double-walled base mold member 17 and a pair of double-walled lid mold members 18, as explained above. FIG. 15 provides an exploded view which illustrates how the double-walled base mold member 17 is constructed. In general, the base mold member 17 comprises an inner mold form wall 101, an outer jacket wall 103, a perimeter seal flange 105 (broadly, a perimeter seal), and a plurality of radial supports 107. In the elongate mold 16 depicted in FIG. 14, each of the lid mold members is likewise constructed of an inner mold form wall, an outer jacket wall, a perimeter seal flange, and a plurality of radial supports. Comparing the illustrated base mold member 17 and each of the illustrated lid mold members 18, the only significant difference in construction is driven by the size, shape, and arrangement of the respective mold members. Accordingly, it is to be understood that the lid mold members 18 are constructed from respective inner mold form walls 101, outer jacket walls 103, perimeter seal flanges 105, and radial supports 107 in substantially the same way as described below in regard to the base mold member 17.

Referring to FIG. 15, the inner form wall 101 is configured to define a portion of the perimeter of the mold cavity of the elongate mold 16. The outer jacket wall 103 is spaced apart radially outward of the inner form wall 101 with respect to the longitudinal axis of the elongate mold 16 such that the inner form wall and the outer jacket wall define a fluid annulus section therebetween. (The annulus sections located between the inner form wall and outer jacket wall of the base mold member 17 and each of the lid mold members 18 collectively form the fluid annulus of the elongate mold 16). To reduce the bending moment of the elongate mold 16, the outer jacket wall 103 is mounted relatively close to the inner form wall 101, which minimizes the radial thickness of the annulus section with respect to the longitudinal axis of the mold 16. However, a sufficient radial space is still provided to allow fluid flow (e.g., predominantly laminar fluid flow) through the annulus section. In one or more embodiments, the radial thickness of the annulus section is less than about 1.0 inch, e.g., less than 0.5 inch, and the radial thickness can be about 0.375 inch. In certain embodiments, the radial thickness of the annulus section with respect to the longitudinal axis of the mold is greater than 0.25 inches.

In the illustrated embodiment, each of the inner form wall 101 and the outer jacket wall 103 is formed from a single contiguous piece of sheet metal that is roll-formed to have an arcuate shape. The arcuate inner form wall 101 has a radius of curvature that is less than the radius of curvature of the arcuate jacket wall 103. In one or more embodiments, the inner and outer surfaces of one or both of the inner form wall 103 and the outer jacket wall 103 are substantially smooth, for example, substantially free of integral protrusions or dimples.

In the illustrated embodiment the outer jacket wall 103 is pre-formed to have a plurality of holes 109 at spaced apart locations along its length. The holes 109 are sized and arranged so that radial supports 107 can extend through the holes into engagement with the inner form wall 101. In the illustrated embodiment, the outer jacket wall 103 comprises two rows of longitudinally spaced holes 109, and the two rows are circumferentially spaced with respect to the longitudinal axis LA of the mold 16.

Each of the inner form wall 101 and the outer jacket wall 103 comprises a respective perimeter edge margin. When the mold member 17 is assembled, the flange seal 105 extends around the perimeter edge margin of each of the inner form wall 101 and the outer jacket wall 103. The flange seal 105 extends radially from the inner form wall 101 to the outer jacket wall 103 to enclose the perimeter of the annulus section located between the form wall and the jacket wall. In the illustrated embodiment, the flange seal 105 is seal welded (broadly, sealingly engaged with) the perimeter edge margin of the inner form wall 101 and the perimeter edge margin of the outer jacket wall 103 about the entire perimeters thereof to seal the annulus section.

Figure 17:
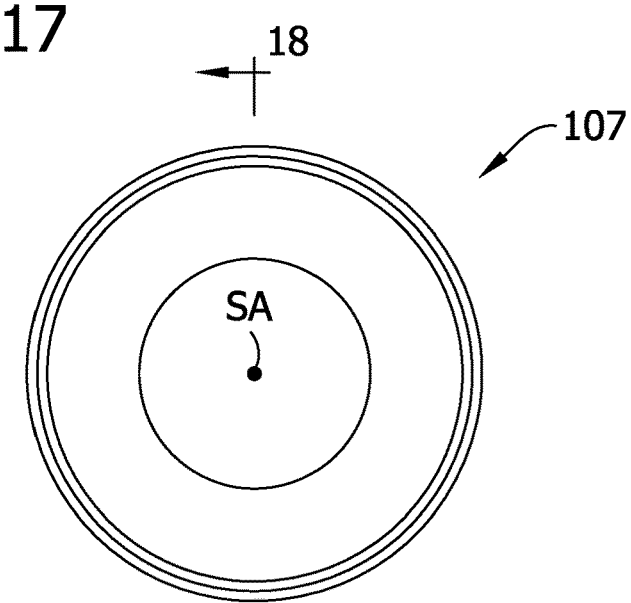
FIG. 17 is a top plan view of the radial support.
Figure 18:
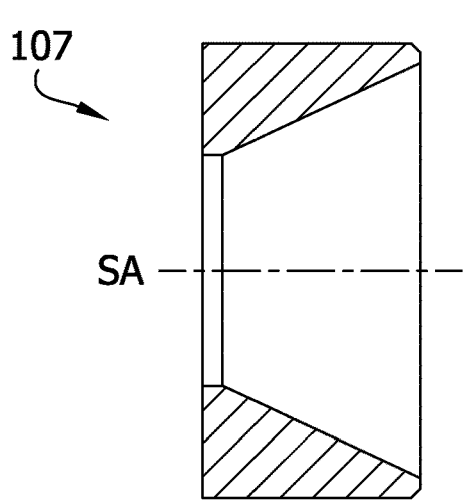
FIG. 18 is a cross section of the radial support.

The radial supports 107 are connected to the double-walled mold member 117 at spaced apart locations along the length of the mold 16. The radial supports 107 align with the holes 109 in the outer jacket 103. Thus, In the illustrated embodiment, the mold member 17 comprises two rows of longitudinally spaced supports 107, and the two rows are circumferentially spaced with respect to the longitudinal axis of the mold 16. Each radial support 107 has an inner end region and an outer end region spaced apart along a respective support axis SA (FIGS. 17 and 18). Each support axis SA extends generally radially with respect to the longitudinal axis of the elongate mold 16. The inner end region of each radial support 107 is seal welded (broadly, joined) to the inner form wall 101, and the outer end region of each radial support is seal welded (broadly, joined) to the outer jacket wall 103. The radial supports 107 thereby support the inner form wall 101 and the outer jacket wall 103 in radially spaced apart relation. Unlike the internal gussets of prior art double-wall molds, which extend edge-to-edge in the annulus section and connect to the flange seal, the radial supports 107 are spaced apart from the flange seals 105 such that the fluid annulus section extends 360 degrees about each radial support with respect to the respective support axis SA. The relatively small radial supports 107 do not substantially increase the rigidity or bending moment of the mold member 17. Further, the radial supports 107 facilitate manufacture of the mold member 17 to have an annulus section radial thickness of less than about 1.0 inch, which is not possible using known conventional manufacturing methods which place internal bulkheads inside the annulus section. Thus, in the illustrated embodiment, the relatively small radial supports 107 provide radial support to the inner form wall 101 to prevent the inner form wall from collapsing due to excess pressure in the annulus section. Moreover, the radial supports 107 prevent collapse of the inner form wall 101 without substantially increasing the rigidity or bending moment of the elongate mold member 117.

Figure 16:
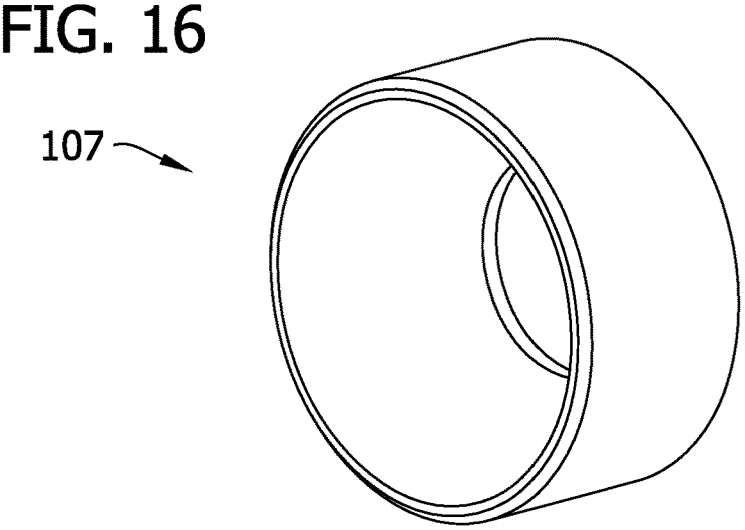
FIG. 16 is a perspective of a radial support of the double-walled base member.

Referring to FIGS. 16-18, in the illustrated embodiment, each radial support 107 comprises a separate annular component with an interior portion defining an inner perimeter that extends circumferentially about the support axis SA and an exterior portion defining an outer perimeter that likewise extends circumferentially about the support axis. In an exemplary embodiment, the inner perimeter of the radial support 107 is conical, for example, having an inner cross-sectional dimension that decreases along the support axis from adjacent the outer end region of the support toward the inner end region. Each radial support 107 is joined to the inner form wall 101 by a seal weld at the inner end region along the inner perimeter of the support. Further, each radial support 107 is joined to the outer jacket wall 103 by a seal weld at the outer end region along the outer perimeter.

The annular radial supports 107 enable each double-walled elongate mold member 117 to be manufactured to have a relatively small radial dimension using equipment that is widely available at machine shops. In an exemplary method of manufacturing the double-walled elongate mold member 117, the inner form wall 101 is rolled (broadly, formed) from a piece of sheet metal (e.g., sheet metal of less than 0.2 inches in thickness). Additionally, the outer jacket wall 103 is rolled (broadly, formed) from a piece of sheet metal (e.g., sheet metal of less than 0.2 inches in thickness), and the holes 109 are cut in the outer jacket wall at spaced apart locations along its length. In certain exemplary embodiments, the holes 109 have inner cross-sectional dimensions that are about the same as the outer cross-sectional dimension of the radial supports 107. The flange seals 105 are seal welded onto the perimeter edge margin of each of the inner form wall 101 and the outer jacket wall 103 to support the outer jacket wall on the inner form wall such that the outer jacket wall is radially spaced apart from the inner from wall with respect to the longitudinal axis of the elongate mold 16. This positions the outer jacket wall 103 and the inner form wall 101 to define the fluid annulus section therebetween. Once the outer jacket wall 103 has been supported on the inner form wall 101, a radial support 107 is placed into each of the openings 109. For each radial support 107, the manufacturer forms a seal weld between the inner end region of the radial support and the inner form wall 101. This inner seal weld extends 360 degrees about the support axis SA along the inner perimeter of the radial support 107. Further the manufacturer forms a seal weld between the outer end region of the radial support 107 and the outer jacket wall 103. This outer seal weld extends 360 degrees about the support axis SA along the outer perimeter of the radial support 107. The seal welded radial supports 107 thus seal the fluid annulus section from leaking fluid through the openings 109. In the illustrated embodiment optional external gussets 111 are attached to the exterior of the outer jacket wall 103 at spaced apart locations along its length. The inventor believes that the external gussets 111 can be omitted to further reduce the rigidity and bending moment of the elongate mold 16, if desired.

The same basic sequence of steps can be performed to form each of the elongate lid members 18, and then the double-walled lid members can be pivotably connected to opposite sides of the elongate base member 17 to form the mold 16. At any point in time after the elongate base mold member 17 is formed, a plurality of mold coupling plates 52 can be attached to the base member 17 at spaced apart locations along its length. As will be explained in further detail below, mold coupling plates 52 facilitate operative connection of the mold 16 to the mold adjustment mechanism 20.

Although an exemplary embodiment of a double-walled mold 16 with relatively low resistance to bending has been described above, it will be understood that the mold adjustment mechanism 20 described in further detail below can be used with other types of elongate molds without departing from the scope of the disclosure. For instance, it is contemplated that the mold adjustment mechanism 20 can be operatively mounted on the base 12 for releasable and interchangeable attachment to various molds, including the mold 16, via the mold coupling plates 52. This allows for different molds to be used interchangeably with the same mold adjustment mechanism and base.

Referring to FIGS. 6-12, in an exemplary embodiment, the base 12 comprises an elongate beam that is very resistant to bending deflection (e.g., has great bending stiffness). In one or more embodiments, the base 12 can be configured for use in a partially freestanding configuration in which the base is fastened the floor only at its end portions (or not at all), with the middle portion of the base not being fastened to the floor. Hence, the base 12, because of its inherent structural properties (e.g., beam moment of inertia, bending stiffness), is configured to deflect only minimally when the adjustment mechanism 20 imparts forces between the base and the elongate mold 16 to adjust the shape of the mold to correspond to the shape of a sagging pipe P. In one or more embodiments, the base 12 is configured to deflect less than the elongate mold 16 when the mold adjustment mechanism 20 moves a portion of the elongate mold relative to the base to adjust the shape of the mold.

The illustrated base 12 has an I-beam shape including an upper flange portion 23, a lower flange portion 24, and a vertical web portion 26 extending between the lower flange portion to the upper flange portion. The lower flange portion 24 is wider than the upper flange portion 23 in the illustrated embodiment. The base further comprises first and second lip portions 28 extending upward from opposite lateral edge margins of the lower flange portion 24. In the drawings, the lip portions 28 are only visible in FIGS. 4-7; the lip portions are removed in FIGS. 8-12 for ease of visualizing other features of the molding system 10. Each of the first and second lip portions 28 can mount the lower end of one or more actuators for opening and closing the elongate mold 16. However, in FIGS. 4 and 5, another type of opening/closing actuator 22 is used which attaches to the mold 16 in a different way. Further, the lip portions 28 define cabling/hose channels on top of the lower flange portion 24 on each lateral side of the web portion 26.

Figure 6:
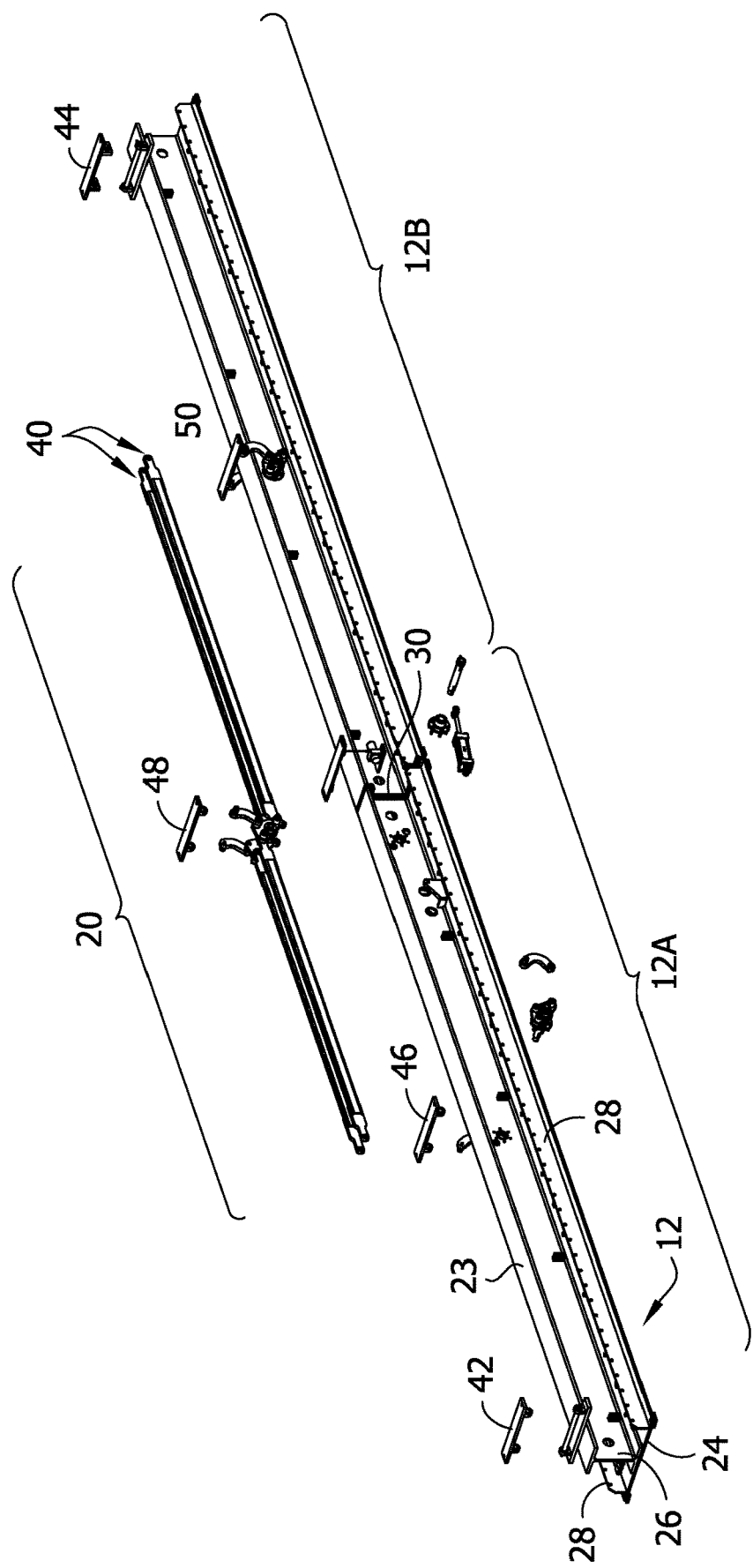
FIG. 6 is an exploded perspective of a base and a mold adjustment mechanism of the molding system.
Figure 7:
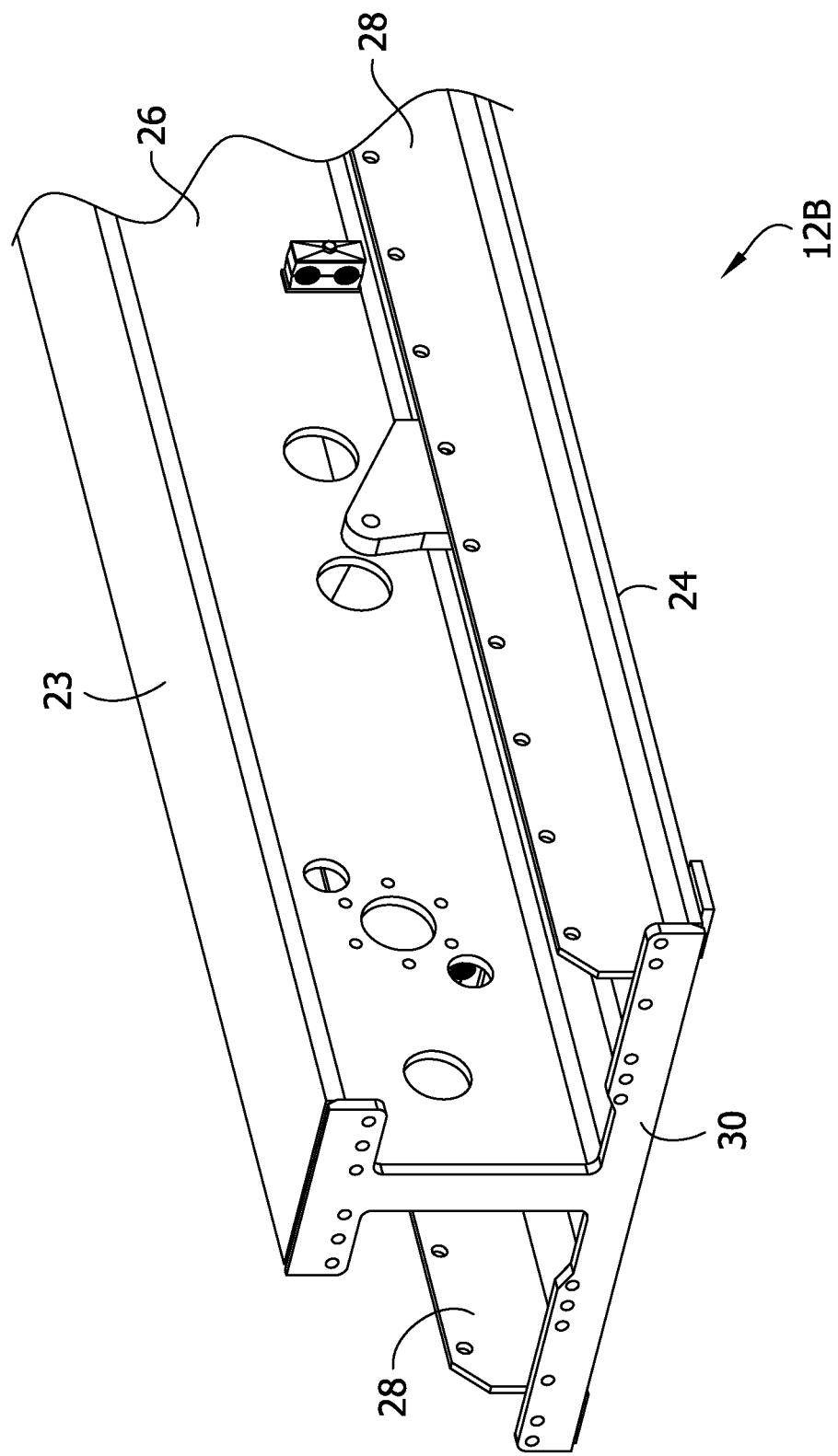
FIG. 7 is an enlarged fragmentary perspective of an end portion of a longitudinal section of the base.
Figure 8:
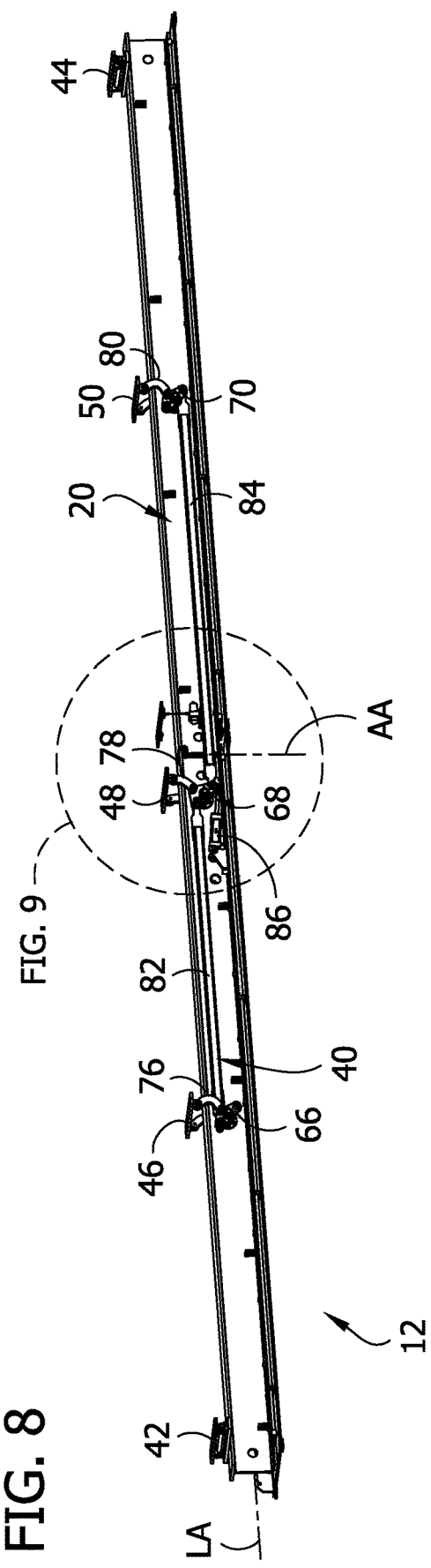
FIG. 8 is a perspective of the base and the mold adjustment mechanism.
Figure 9:
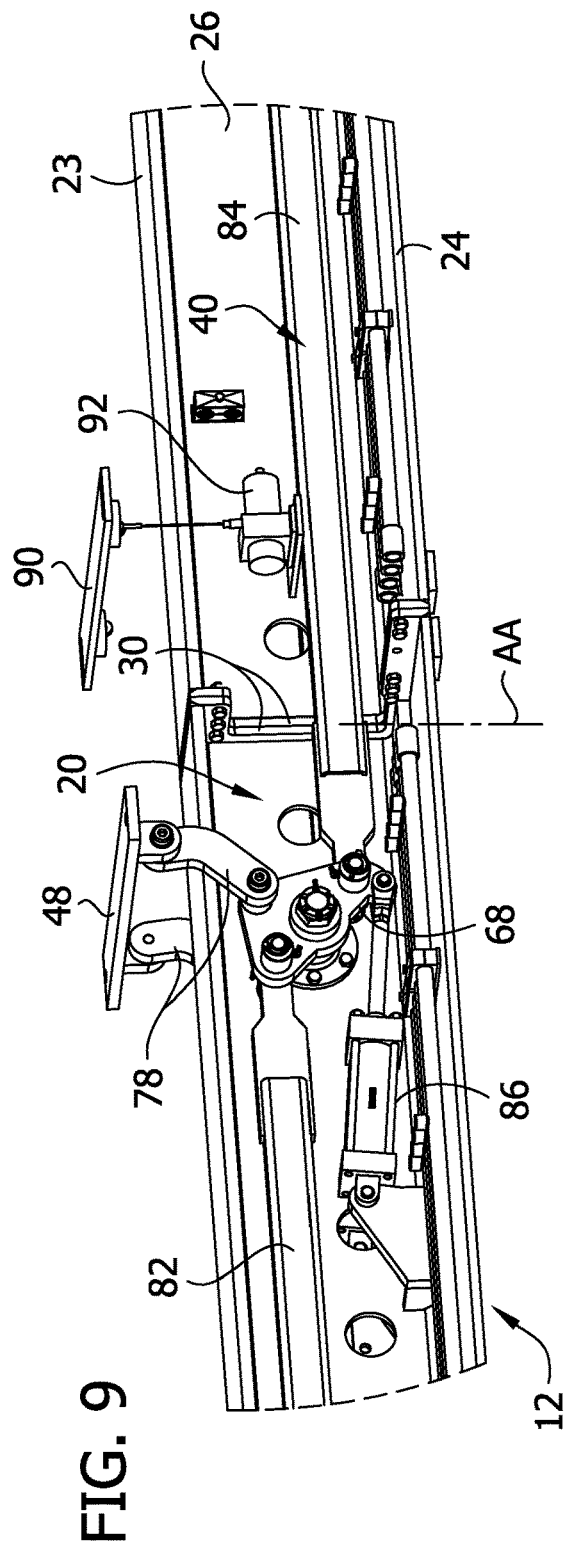
FIG. 9 is an enlarged view of the portion of FIG. 8 at the callout for FIG. 9.

To facilitate shipping the molding system 10 in standard shipping containers, the illustrated base 12 comprises first and second longitudinal base sections 12A, 12B (FIG. 6) that are releasably attached end-to-end to form the full-length base. Each of the first longitudinal base section 12A and the second longitudinal base section 12B comprises an attachment flange 30 on a longitudinal end portion thereof. An exemplary embodiment of an attachment flange 30 is seen clearly in FIG. 7. As shown in FIGS. 6 and 9, the attachment flanges 30 are fastened together (e.g., via bolts or other removable fasteners) in face-to-face relationship to assemble the base. The attachment flanges 30 are designed to withstand the maximum force and moment imparted on the base 12 during operation of the adjustment mechanism 20.

In one or more embodiments, the base 12 can be equipped with several convenience features. For instance, the illustrated attachment flange 30 is shaped to permit the routing of hydraulic lines (broadly, control lines) and other wires or conduits. In addition, holes are formed in the vertical web portion 26 for lifting the base 12, attaching various components of the adjustment mechanism 20, routing hoses and wires, and providing maintenance access.

The illustrated mold adjustment mechanism 20 generally comprises one or more linkages 40 that are connected between the base 12 and the elongate mold 16 and are movable to move a portion of the elongate mold relative to the base along an adjustment axis AA to adjust a curvature (broadly, shape) of the mold. In the illustrated embodiment, the adjustment mechanism 20 comprises a first linkage 40 on one lateral side of the base 12 and a second linkage (see FIG. 6) that is substantially identical to the first linkage but mounts on the opposite lateral side of the base. In general, a suitable linkage 40 will comprise a coupling that is connected to a portion of the elongate mold for moving that portion of the mold along the adjustment axis LA with respect to the base.

Various arrangements of linkages are contemplated to be within the scope of the present disclosure. However, the illustrated linkages 40 are generally configured to couple to the elongate mold 16 at a plurality of locations between the end portions of the elongate mold for pulling the middle portion of the mold downward with respect to the end portions of the mold and thereby adjusting the mold from a straight configuration to curved configuration in which the mold bows downward toward the middle to match the curvature of a sagging pipe P. It is also contemplated that other mechanisms or linkages could be used which primarily act to push the end portions of the mold upward with respect to the middle portion or which simultaneously push the end portions of the mold upward and pull the middle portion of the mold downward with respect to the base.

Each individual linkage 40 is a multipoint linkage that couples to the elongate mold 16 at a plurality of spaced apart locations along the length of the elongate mold so that the individual linkage can adjust the shape of the mold along its length. In other words, the illustrated adjustment mechanism 20 does not use or require discrete mechanisms (e.g., individual hydraulic cylinders) for repositioning the mold at spaced apart locations along the length of the mold. Instead, the illustrated adjustment mechanism 20 is configured to use the constrained motion of individual linkages 40 to simultaneously adjust the positions of several portions of the mold 16 along the adjustment axis AA. The inventors believe that the use of a multipoint mechanical linkage 40 instead of separate actuators at spaced apart locations along the length of the mold is advantageous because it eliminates the possibility of a "zone malfunction." Assume there were several separate hydraulic actuators acting in coordination to adjust the positions of different longitudinal zones of the mold. If one of the hydraulic actuators were to fail, it would cause the mold to deform in ways for which it was not designed, leading potentially to catastrophic failure. By contrast, the multipoint linkages 40 ensure that anytime the mold is adjusted, each attachment point between the mold 12 and the adjustment mechanism 20 is being simultaneously adjusted in way that is consistent with the bending capabilities of the mold. If an actuator fails, the entire linkage stops moving, maintaining the mold in a non-destructive position until the actuator can be repaired. Although using multipoint linkages to adjust the shape of the mold may be preferable for the foregoing reasons, it is contemplated that an adjustable molding system could employ separate actuators at spaced apart locations along the length of the mold within the scope of this disclosure. In these embodiments, it is preferable to coordinate the control of the separate actuators so that, if one actuator were to fail, the failure is detected and the remaining actuators immediately stop moving the mold to mitigate against zone malfunctions.

In an exemplary embodiment, the linkages 40 are relatively compact. Each illustrated linkage 40 is sized and arranged to fit entirely below the mold 16 along its full range of motion. Further linkages 40 are sufficiently compact (e.g., short in height) to enable safe and ergonomic preparation and filling from the top of the mold 16 during use. Each illustrated linkage 40 also fits entirely within a lateral space above the lower flange portion 24 of the base 12, inboard of the respective lip 28. This minimizes lateral space requirements and allows the mold opening/closing actuators 22 to mount on the base without interfering with the linkages 40.

In the illustrated embodiment, the base 12 includes a first base fixture plate 42 and a second base fixture plate 44 (each, broadly, a fixture) mounted on the first and second end portions of the base for mounting the first and second end portions of the elongate mold 16 on the base at fixed positions. The linkages 40 are both connected to a first base coupling plate 46 at a location spaced apart between the first fixture 42 and the second fixture 44, a second base coupling plate 48 (broadly, a middle coupling plate) at a location spaced apart between the first base coupling plate and the second fixture, and a third base coupling plate 50 at a location spaced apart between the second base coupling plate and the second base fixture plate. Each base coupling plate 46, 48, 50 broadly comprises a coupling for attaching the linkages 40 to the mold 16 at a respective point along the length of the mold such that the linkages can drive movement of a corresponding section of the mold to adjust the mold shape.

Figure 13:
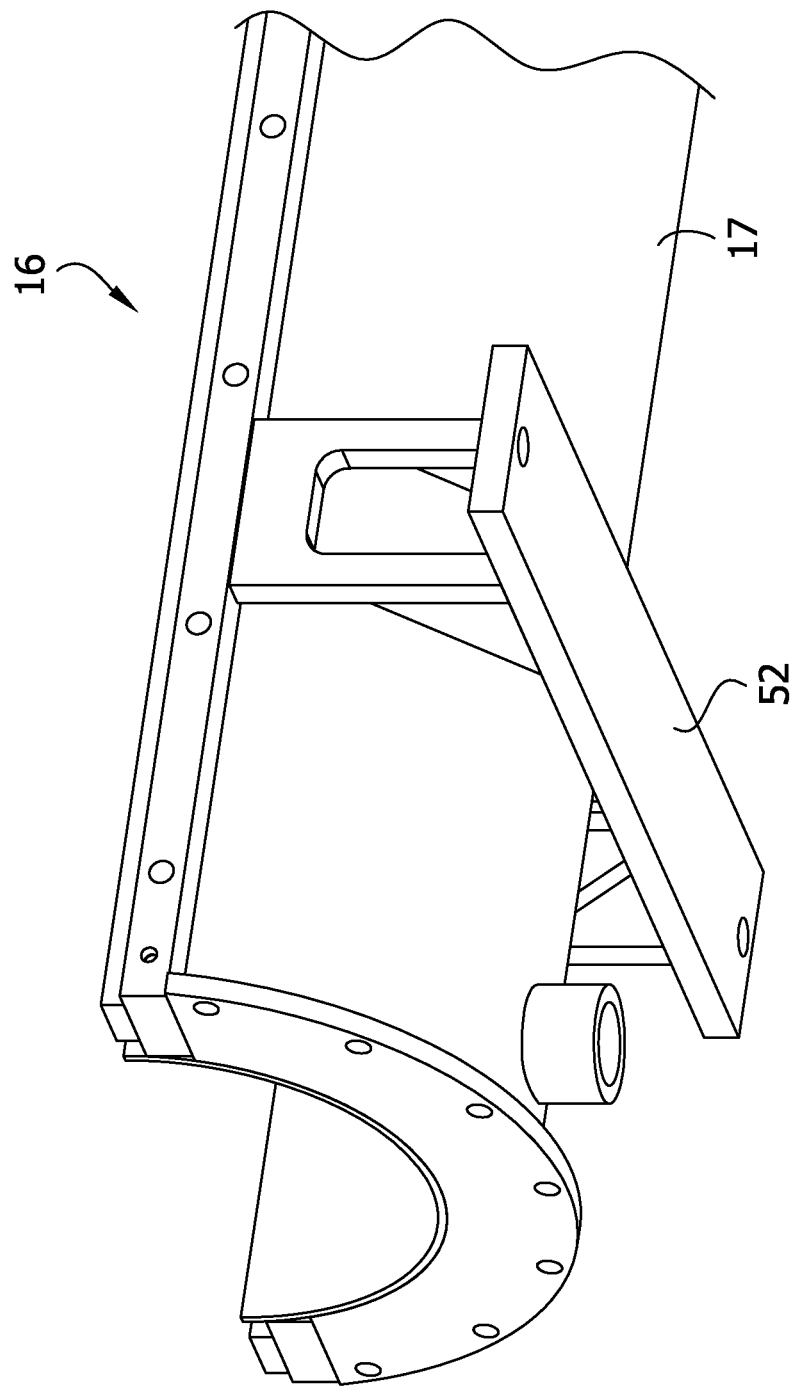
FIG. 13 is a perspective of a base mold member showing how a fixture plate attaches to the elongate mold.

FIG. 13 shows one mold coupling plate 52 that is mounted on the base portion 17 of the mold 16 and configured to be releasably attached (e.g., via removable fasteners such as bolts) to a respective one of the base fixture plates 42, 44 or the base coupling plates 46, 48, 50. In the illustrated embodiment, it will be appreciated that the elongate mold 16 is fitted with five base fixture plates 52 at spaced apart locations along the length of the mold, one for attaching to each of the base fixture plates 42, 44 and the base coupling plates 46, 48, 50. Accordingly, the illustrated mold 16 comprises first and second mold coupling plates 52 that are configured to be fastened (e.g., bolted) to the first and second base fixture plates 42, 44, respectively, and three mold coupling plates 52 that are configured to be attached to each of the base coupling plates 46, 48, 50. Each mold coupling plate 52 is fastened to the respective base coupling plate 46, 48, 50 such that the mold coupling plate moves conjointly with the base coupling plate along the adjustment axis AA with respect to the base 12. Further, each mold coupling plate 52 is configured to cause the nearest longitudinal section or zone of the mold 16 to move substantially conjointly with the respective base coupling plate 46, 48, 50 along the adjustment axis AA. It can be seen that elongate molds of various configurations could be fitted with a set of mold coupling plates for selectively and operatively connecting the base 12 and the mold adjustment mechanism 20 to a mold of a desired configuration or type.

Each linkage 40 comprises first, second, and third base-mounted rockers 66, 68, 70 that are pivotably connected to the base 12 at spaced apart locations along the length of the base. A first coupling rocker 76 is pivotably connected to the first base-mounted rocker 66 at a first (lower) pivot point and is pivotably connected to the first base coupling plate 46 at a second (upper) pivot point. Likewise, a second coupling rocker 78 is pivotably connected to the second base-mounted rocker 68 at a first (lower) pivot point and is pivotably connected to the second base coupling plate 48 at a second (upper) pivot point. A third coupling rocker 80 is pivotably connected to the third base-mounted rocker 70 at a first (lower) pivot point and is pivotably connected to the third base coupling plate 50 at a second (upper) pivot point. A first elongate link 82 has a first end portion pivotably connected to the first base-mounted rocker 66 and an opposite second end portion pivotably connected to the second base-mounted rocker 68, and a second elongate link 84 has a first end portion pivotably connected to the second base-mounted rocker and an opposite second end portion pivotably connected to the third base-mounted rocker 70. All pivot axes (not labeled) are oriented parallel to one another and orthogonal to the longitudinal axis LA and the adjustment axis AA.

For each linkage 40, a single driver 86 is configured to drive the linkage through its range of motion, thereby adjusting the location of each of the first, second, and third base mounted coupling plates 46, 48, 50. In the illustrated embodiment, each driver 86 comprises a linear actuator (e.g., a hydraulic piston) having a first end portion pivotably connected to the base 12 and a second end portion pivotably connected to one of a base-mounted rockers 68 to pivot the base-mounted rocker with respect to the base 12 and thereby drive the linkage through its range of motion.

Referring to FIGS. 10-12, each driver 86 is configured to drive the linkage 40 through a range of motion that includes a first position at which the first and second base mounted fixtures 42, 44 and each of the first, second, and third base mounted couplings 46, 48, 50 are located along an imaginary line IL oriented parallel to the longitudinal axis LA. Thus it can be seen that at the first position of the linkage range of motion, the linkage 40 is configured support the elongate mold 16 so that it extends in a substantially straight line along the longitudinal axis LA. As the linkages 40 move from the first position to a second (e.g., terminal) position of the linkage range of motion (shown in FIG. 10), each of the first, second, and third base mounted couplings 46, 48, 50 moves downward along the adjustment axis AA below the imaginary line IL. The first and third base mounted coupling plates 46, 50 move downward along the adjustment axis AA at about the same rate and the second base mounted coupling plate 48 moves downward at a faster rate such that the second base mounted coupling plate becomes increasingly spaced apart below the first and third base mounted coupling plates as the linkages 40 move from the first position to the second position along their range of motion. Each linkage 40 simultaneously moves each of the first, second, and third base mounted couplings 46, 48, 50 such that the first and second base mounted fixtures 42, 44 and the first, second, and third base mounted couplings 46, 48, 50 define imaginary arcs IA of decreasing radius of curvature as the linkages moves from the first position to the second position. At the terminal second position of the range of motion, the second base mounted coupling plate 48 is offset from the first and second base mounted fixtures 42, 44 along the adjustment axis AA by a maximum sag adjustment distance AD (FIG. 10) in an inclusive range of from about 0.25 inches to about 12 inches (e.g., an inclusive range of from about 1 inch to about 6 inches).

Referring to FIGS. 9 and 11, the illustrated molding system 10 further comprises a base mounted transducer plate 90 for connecting a linear transducer 92 to the mold 16 at about the midpoint of the length of the mold. In the illustrated embodiment, the base mounted transducer plate 90 is located near the midpoint of the length of the base 12 and mold 16. The base mounted transducer plate 90 is configured to releasably attach to another mold coupling plate 52 fixed on the base portion 17 of the mold 16 for conjoint movement therewith. The linear transducer 92 is connected between the base 12 and the mold transducer plate 90 to detect a position of the transducer plate along the adjustment axis AA. Thus the linear transducer 92 provides a signal that can be used for determining the location of the middle portion of the mold 16 along the adjustment axis AA, which corresponds to the position of the linkages 40 and the curvature/amount of bending (broadly, shape) of the mold. The molding system 10 can further comprise a measurement device (not shown) on (e.g., inside of) the elongate mold 16 that is configured to measure a radial distance between the elongate mold and the pipe with respect to the longitudinal axis A. This measurement device and the linear transducer 92 can be used to provide feedback for controlling the mold adjustment mechanism 20 for adjusting the shape (e.g., curvature) of the mold to correspond to the shape (e.g., curvature) of the sagging pipe inside the mold.

An exemplary method of using the molding system 10 will now be briefly described. Initially, the elongate mold 16 is opened and the pipe P is placed into the mold so that the pipe is supported at its opposite end portions and allowed to sag within the mold cavity. In an exemplary embodiment, the mold 16 is closed before the adjustment mechanism 20 is actuated to adjust the shape of the mold. After closing the mold 16, the adjustment mechanism 20 is actuated to move within its range of motion from the first position at which the first and second base mounted fixtures 42, 44 and each of the first, second, and third base mounted couplings 46, 48, 50 are located along the imaginary line IL toward the second position so that the first and second base mounted fixtures 42, 44 and the first, second, and third base mounted couplings 46, 48, 50 define an imaginary arc IA. Thus, the adjustment mechanism 20 pulls the middle portion of the elongate mold 16 downward to cause the mold to curve in way that corresponds to the curvature of the sagging pipe. By monitoring the signals from the linear transducer 92 and the pipe position measurement device (not shown) on the mold 16, a user or a controller can determine when the shape of the mold 16 has been adjusted so that the pipe P is substantially centered within the mold. The linkages 40 are maintained at this position as moldable material is imparted into the mold 16 and cured. In preferred embodiments, the moldable material is, when cured, a thermally insulating material. However, other types of moldable material may be applied.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A molding system for applying insulation to a pipe, the molding system comprising:
    an elongate mold having a length along a longitudinal axis extending from a first end portion to a second end portion, the elongate mold including a mold member having a base mold member and at least one lid mold member mounted on the base mold member for opening and closing the elongate mold, and an inner form wall defining a mold cavity in which to receive the pipe such that the pipe is supported at the first end portion and the second end portion of the elongate mold and is allowed to sag in the mold cavity between the first end portion and the second end portion of the elongate mold; and
    a mold adjustment mechanism connected to the mold member to adjust the base mold member from a straight configuration to a curved configuration in which the base mold member bows downward to match a curvature of the pipe as the pipe sags and for moving the mold member to adjust a shape of the inner form wall of the mold member to correspond to a shape of the pipe as the pipe sags in the mold cavity.

2. The molding system as set forth in claim 1, further comprising a base, the mold adjustment mechanism being configured to move the base mold member relative to the base along an adjustment axis oriented transverse to the longitudinal axis to adjust the shape of the mold.

3. The molding system as set forth in claim 2, wherein the mold adjustment mechanism comprises a linkage connected between the base and the elongate mold.

4. The molding system as set forth in claim 3, wherein the linkage comprises a coupling connected to the base mold member and wherein the mold adjustment mechanism is configured to move said coupling relative to the base to move the base mold member relative to the base.

5. The molding system as set forth in claim 4, wherein said coupling comprises a plurality of couplings at spaced apart locations along the length of the elongate mold.

6. The molding system as set forth in claim 5, wherein the linkage is configured to simultaneously move the plurality of couplings along the adjustment axis.

7. The molding system as set forth in claim 6, further comprising a single driver configured to drive movement of the linkage.

8. The molding system as set forth in claim 7, wherein the base has a length along the longitudinal axis and the linkage comprises:
    first, second, and, third base-mounted rockers pivotably connected to the base at spaced apart locations along the length of the base;
    a first coupling rocker pivotably connected to the first base-mounted rocker, the plurality of couplings comprising a first coupling pivotably connected to the first coupling rocker;
    a second coupling rocker pivotably connected to the second base-mounted rocker, the plurality of couplings comprising a second coupling pivotably connected to the second coupling rocker;
    a third coupling rocker pivotably connected to the third base-mounted rocker, the plurality of couplings comprising a third coupling pivotably connected to the third coupling rocker;
    a first elongate link having a first end portion pivotably connected to the first base-mounted rocker and an opposite second end portion pivotably connected to the second base-mounted rocker; and
    a second elongate link having a first end portion pivotably connected to the second base-mounted rocker and an opposite second end portion pivotably connected to the third base-mounted rocker.

9. The molding system as set forth in claim 8, wherein the single driver comprises a linear actuator having a first end portion pivotably connected to the base and a second end portion pivotably connected to one of the first, second, and third base-mounted rockers.

10. The molding system as set forth in claim 9, wherein the linkage and the single driver is located on a first lateral side of the base, the adjustment mechanism further comprising another linkage and another driver located on an opposite second lateral side of the base.

11. The molding system as set forth in claim 8, further comprising a first fixture connecting the first end portion of the elongate mold to the base at a fixed position and a second fixture connecting the second end portion of the elongate mold to the base at a fixed position, the first coupling, the second coupling, and the third coupling being spaced apart along the length of the mold between the first fixture and the second fixture.

12. The molding system as set forth in claim 11, wherein the driver is configured to drive the linkage through a range of motion that includes a first position at which the first fixture, the second fixture, the first coupling, the second coupling, and the third coupling are located along an imaginary line oriented parallel to the longitudinal axis and a second position at which each of the first coupling, the second coupling, and the third coupling are spaced apart along the adjustment axis below the imaginary line.

13. The molding system as set forth in claim 12, wherein when the linkage is at the second position of the range of motion, the second coupling is spaced apart along the adjustment axis below the first coupling and the third coupling.

14. The molding system as set forth in claim 13, wherein when the linkage is at the second position of the range of motion, the first fixture, the second fixture, the first coupling, the second coupling, and the third coupling are located along an imaginary arc having a finite radius of curvature.

15. The molding system as set forth in claim 12, wherein at the second position of the range of motion the second coupling is offset from the first and second fixtures along the adjustment axis by a sag adjustment distance in an inclusive range of from about 0.25 inches to about 12 inches.

16. The molding system as set forth in claim 7, wherein the single driver is configured to drive the linkage through a range of motion that includes a first position at which the plurality of couplings are located along an imaginary line oriented parallel to the longitudinal axis and a second position at which the plurality of couplings are located along an imaginary arc having a finite radius of curvature.

17. The molding system as set forth in claim 5, wherein each of the plurality of couplings comprises a base coupling plate, the elongate mold comprising a corresponding mold coupling plate for each base coupling plate, each mold coupling plate being fastened to the base coupling plate such that the mold coupling plate moves conjointly with the base coupling plate with respect to the base.

18. The molding system as set forth in claim 17, wherein each mold coupling plate is mounted on the elongate mold at a respective location along the length of the mold such that the mold coupling plate is configured to cause the base mold member to move substantially conjointly with the mold coupling plate with respect to the base at the respective location along the length of the mold.

19. The molding system as set forth in claim 2, further comprising a linear transducer connected between the base and the base mold member to detect movement of the base mold member along the adjustment axis.

20. The molding system as set forth in claim 2, wherein the base is configured to deflect less than the elongate mold when the mold adjustment mechanism moves the base mold member relative to the base along an adjustment axis.

21. The molding system as set forth in claim 2, wherein the base has an I-beam shape including an upper flange portion, a lower flange portion, and a vertical web portion extending from the lower flange portion to the upper flange portion.

22. The molding system as set forth in claim 21, wherein the lower flange portion is wider than the upper flange portion.

23. The molding system as set forth in claim 21, wherein the base further comprises first and second lip portions extending upward from opposite first and second lateral edge margins of the lower flange portion.

24. The molding system as set forth in claim 23, wherein each of the first and second lip portions is configured to attach to one or more actuators for opening and closing the elongate mold.

25. The molding system as set forth in claim 2, wherein the base comprises a first longitudinal base section and a second longitudinal base section releasably attached to the first longitudinal base section in end-to-end relationship therewith.

26. The molding system as set forth in claim 25, wherein each of the first longitudinal base section and the second longitudinal base section comprises an attachment flange on a longitudinal end portion thereof, the attachment flanges being fastened together in face-to-face relationship.

27. The molding system as set forth in claim 1, further comprising a measurement device on the elongate mold configured to measure a radial distance between the elongate mold and the pipe.

28. The molding system as set forth in claim 1, wherein the length of the elongate mold is greater than 35 feet.

29. A molding system for applying insulation to a pipe, the molding system comprising:
    an elongate mold having a length along a longitudinal axis extending from a first end portion to a second end portion, the elongate mold including a mold member having a base mold member and at least one lid mold member mounted on the base mold member for opening and closing the elongate mold, and an inner form wall defining a mold cavity in which to receive the pipe such that the pipe is supported at the first end portion and the second end portion of the elongate mold and is allowed to sag in the mold cavity between the first end portion and the second end portion of the elongate mold; and
    a mold adjustment mechanism connected to the mold member to move the base mold member from a straight configuration to a curved configuration.

* * * * *